United States Patent [19]

Caldwell et al.

[11] Patent Number: 5,192,495
[45] Date of Patent: Mar. 9, 1993

[54] SIC BARRIER OVERCOATING AND INFILTRATION OF FUEL COMPACT

[75] Inventors: Colin S. Caldwell, Lynchburg; Helen H. Moeller, Concord, both of Va.

[73] Assignee: Babcock & Wilcox Company, New Orleans, La.

[21] Appl. No.: 821,873

[22] Filed: Jan. 16, 1992

Related U.S. Application Data

[63] Continuation of Ser. No. 661,153, Feb. 27, 1991, abandoned.

[51] Int. Cl.$^5$ .............................................. G21C 3/00
[52] U.S. Cl. .................................. 376/417; 376/411; 376/414; 376/416
[58] Field of Search ............... 376/414, 411, 417, 416; 264/0.5; 419/64, 11, 14; 427/6

[56] References Cited

U.S. PATENT DOCUMENTS

| | | | |
|---|---|---|---|
| 3,249,509 | 5/1966 | Blocher, Jr. | 376/417 |
| 3,276,968 | 10/1966 | Ingleby | 376/411 |
| 3,776,759 | 12/1973 | Ford et al. | 428/404 |
| 3,992,258 | 11/1976 | Tobin | 376/411 |
| 4,056,584 | 11/1977 | Miertschin et al. | 264/0.5 |
| 4,597,936 | 7/1986 | Kaae | 376/411 |
| 4,963,758 | 10/1990 | Noren et al. | 264/0.5 |
| 4,978,480 | 12/1990 | Stansfeild et al. | 264/0.5 |
| 5,037,606 | 8/1991 | Develasco et al. | 376/411 |

Primary Examiner—Donald P. Walsh
Assistant Examiner—Meena Chelliah

[57] ABSTRACT

Nuclear fuel compacts, containing thousands of individually coated fuel particles in a carbonaceous matrix, are provided with an overcoating of silicon carbide which can be readily inspected for defects. This overcoating helps retain fission products within the compact should any of the fuel particles have damaged or defective coatings, and provides an outer secondary barrier that can be 100% inspected.

13 Claims, 1 Drawing Sheet

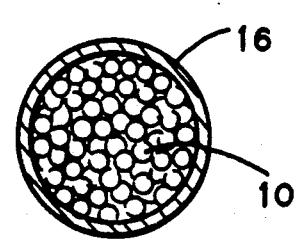
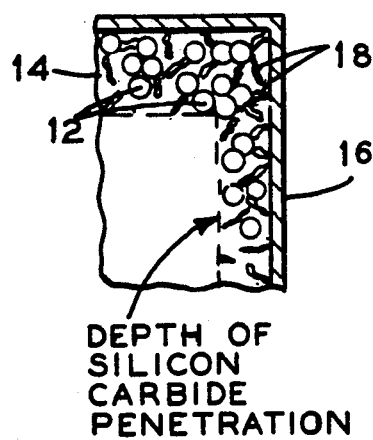
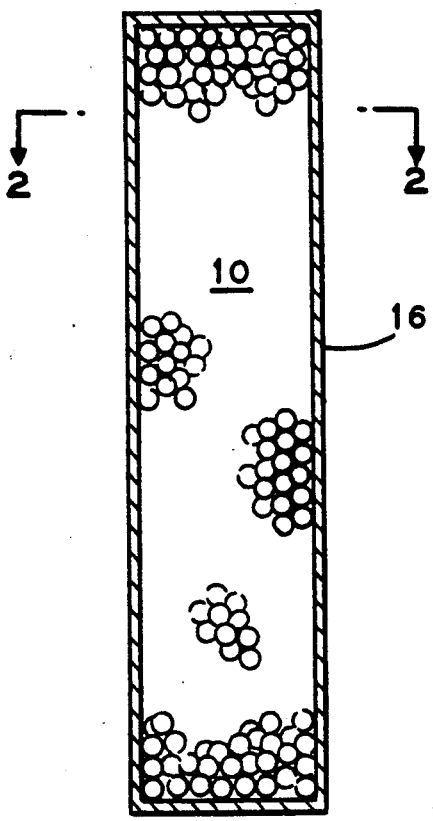

SIC BARRIER OVERCOATING AND INFILTRATION OF FUEL COMPACT

This application is a continuation of application Ser. No. 07/661,153 filed Feb. 27, 1991, and abandoned on May. 7, 1992.

FIELD OF THE INVENTION

This invention pertains to fuel compacts that contain thousands of individually coated fuel particles used for nuclear power generation and more particularly to an inspectable overcoating of the compact to insure the containment of the fission products therein.

BACKGROUND OF THE INVENTION

In nuclear power generation, a graphite fuel element block typically contains a multitude of fuel channels each containing 15 or more fuel compacts stacked end-to-end to form fuel rods within the graphite block. Each fuel compact, in turn, typically contains thousands of U-235 isotopically enriched uranium ceramic fuel particles which, through fission, generate heat. In some reactor designs, uranium 238 or thorium 232 ceramic particles are also included. These convert to plutonium or uranium 233 respectively which are fissionable. Other elements can also be incorporated for neutron absorption control or production of special isotopes such as tritium. The designation "ceramic" refers typically to oxide, nitride, carbide, oxycarbide or other high temperature compounds.

To impart strength to these fuel particles and to retain fission products during normal (and sometimes abnormal) operating conditions, each individual particle is coated with a variety of products such as silicon carbide (U.S. Pat. No. 3,776,759 to Ford et al.), a pyrolytic carbon compound (U.S. Pat. No. 3,945,884 to Freck) or a combination of the two (U.S. Pat. No. 3,249,509 to Blocher, Jr., U.S. Pat. No. 3,276,968 to Ingleby, and many others).

A current fuel compact manufacturing specification calls for a 95% confidence level that no more than 5 particles out of 100,000 have a coating defect. This level of quality control requires extensive sampling and destructive examination of the compact and/or particles to assure compliance.

It is thus an object of this invention to provide a means of achieving the above level of quality and confidence. It is another object of this invention to provide a final coating that can be subjected to a quick, non-destructive method of inspecting the fuel compact in order to assess whether this compact complies with the required specifications or not. A further object of this invention is to provide an additional barrier of silicon carbide so as to contain fission products released during operation or postulated accident condition. Another object of this invention is to enable the silicon carbide coating thickness to be varied as needed under the expected conditions. Still a further object of this invention is to provide a means for curing any defects should such be found. These and other objects of this invention will become obvious upon further investigation.

SUMMARY OF THE INVENTION

A silicon carbide overcoating of a nuclear fuel compact is disclosed whereby the compact, which contains thousands of individually coated fuel particles held together within a carbonaceous matrix, is coated with a continuous barrier of silicon carbide. This overcoating extends well into the pores of the matrix thereby sealing it (and hence the compact) to retain fission products therein. Such an overcoating can be inspected for defects by non-destructive means prior to insertion within a graphite fuel element block, because the coating is totally accessible from the external surface.

BRIEF DESCRIPTION OF THE DRAWINGS

FIG. 1 is a pictorial view of a fuel compact.
FIG. 2 is a top view taken along lines 2—2 of FIG. 1
FIG. 3 is a pictorial view, partially broken away, showing the infiltration of the silicon carbide overcoating.

DETAILED DESCRIPTION OF THE DRAWINGS

Referring to the drawings, compact 10 is shown which contains several thousand uranium or uranium plus thorium particles 12 supported within carbon matrix 14. Continuous silicon carbide overcoating 16 is applied to matrix 14 and, as shown, infiltrates a short distance into matrix 14 via its open porosity. Generally, overcoating 16 is applied using a chemical vapor deposition process thereby permitting such infiltration of matrix 14. However, the method of deposition used can also be by reaction with molten silicon metal followed by diffusion carbonization, or some other method if desired.

Particles 12 are each individually coated such as with silicon carbide and pyrolytic carbon in the normal fashion. These and other coatings impart strength to the uranium or thorium ceramic particles 12 as well as contain fission products resulting during normal operating conditions and during theoretical core overheating following loss of normal coolant flow or pressure. Of the presently available coatings for fuel particles 12, silicon carbide is perhaps the most important because it also acts as a barrier against fuel oxidation by trace moisture or air ingress.

To increase safety and to decrease the possibility of radiation leakage, proposed fuel specifications call for manufacturing, inspection, and certification of fuel compacts to assure a 95% confidence level that no more than 5 or fewer fuel particles out of 100,000 have silicon carbide coating defects such as cracked, defective, or missing coatings. This is accomplished in the present invention by incorporating fuel particles that have initially been certified to meet this specification prior to compact fabrication and then overcoating the entire exterior of matrix 14 with silicon carbide as a final step. In this way, any defect in this overcoating of silicon carbide 16 will be readily apparent by non-destructive means (visually, penetrant, ultrasonics, X-ray, etc.) rather than by having to resort to destructive testing to inspect the individual fuel particles 12 after they are fabricated into compacts. The non-destructive examination techniques could be used to inspect 100% of the compacts, if desired.

Furthermore, by applying overcoating 16 via chemical vapor deposition, or other methods, the continuous layer of silicon carbide can extend radially inward of matrix 14 via a network of silicon carbide fingers 18 that infiltrate the open pores of matrix 14. The amount of infiltrated porosity would typically be from 1% to about 10% of the volume of fuel compact 10. This helps interlock overcoating 16 in place and prevent any spalling, cracking, or debonding during thermal cycling as might otherwise occur due to the difference in thermal expansion between overcoating 16 and matrix 14. To achieve this advantage, it is preferable that the composition of matrix 14 be predominately a rigid carbonaceous mixture and matrix 14 may also contain some graphite powder as well as pyrolyzed pitch and other organic additives. In this fashion, any breaks or defects in overcoating 16 should be readily apparent as aided by the difference in material properties, which can be utilized to improve the sensitivity of non-destructive inspection.

A further embodiment of this invention would be to apply an outer coating around silicon carbide overcoating 16 to protect this overcoating against abrasion during handling or loading or to improve thermal cycling integrity even further should such be necessary. This coating can be pyrolytic carbon or a metallic carbide. Additionally, the thickness of overcoating 16 can be varied as needed ranging from around 50 micro-meters to as much as one millimeter or more. This is considerably easier to accomplish than attempting to increase the coating thickness surrounding the thousands of fuel particles 12.

The several advantages of overcoating 16 are as follows:

1. Overcoating 16 provides a second independent barrier to any fission product released during operation. This second barrier should provide about a ten-fold improvement in fission product retention.
2. Overcoating 16 is spaced some distance from the bulk of fuel particles 12 thus overcoating 16 is at a lower average temperature region than is the coating of particles 12 thereby being more efficient at retaining the fission products.
3. The uranium or thorium kernels tend to migrate within their coatings while held in matrix 14 because of radial thermal gradients within the particles. This can result in thinning of the fuel particle coatings. Overcoating 16 allows the kernels to continue to operate despite a thinning of their coatings while still protecting them and still trapping fission products that may be formed and still maintaining a protective seal around compact 10.
4. The thickness of overcoating 16 can be varied as needed to supplement the barrier provided by the normal coatings of fuel particles 12.
5. Overcoating 16 can be 100% inspected after compact manufacture for integrity, thickness, surface appearance and impurity content.
6. Should defects be found in overcoating 16, the compact can be reworked so as to conform to specifications by recoating either locally or totally.
7. The infiltration of overcoating 16 (fingers 18) into matrix 14 seals off a large number of channels that could otherwise be available to vent fission product gases should a defect occur in the individual coatings of fuel particles 12.
8. Overcoating 16 blocks trace moisture, oil, or air ingress into matrix 14 (and hence fuel particles 12) thereby improving the durability of the fuel and preventing any contamination from occurring.
9. Overcoating 16 permits the use of fuel particles 12 with a variety of coatings thereon because the whole compact 10 itself is protected despite the combination of coatings selected for fuel particles 12.
10. Overcoating 16 also protects against the statistically small number of fuel particles 12 whose coatings become defective due to improper compact manufacture or which become defective because of irradiation-induced fission gas loading pressure, metallic fission product attack, or thermal stresses.
11. Overcoating 16 is ideal for modular high temperature gas-cooled reactors (MHTGR) because of the high temperatures involved and the protection overcoating 16 provides under such conditions.

In view of the above, overcoating 16 provides an additional inspectable barrier at the last point in the fabrication process just before the individual compacts 10 are slid into holes and sealed within a graphite fuel element block. It should here be stated that overcoating 16 is not intended to replace the silicon carbide coating on fuel particles 12, but instead, its function is to add further ambient atmosphere impurity protection and to reduce the release of any fission product for compacts with both failed and unfailed particles 12. The overall result should be better public safety, easier licensability, and better operational safety as a result of lower release of fission products to the internal surfaces of the reactor system or to the secondary steam system. This can reduce worker exposure, improve reactor availability, and thus improve economics of power production.

What is claimed as invention is:

1. An outer barrier comprising an independent silicon carbide overcoating of a nuclear fuel compact, said compact comprising a multitude of individually coated fuel particles held or dispersed within a carbonaceous matrix composed of material other than primarily silicon carbide, said matrix having an outer surface and fingers extending inward therefrom into which said silicon carbide overcoating is deposited thereby completely sealing said matrix, and hence said nuclear fuel compact, and also locking said overcoating in place so as to contain the majority of fission products therein.

2. The silicon carbide overcoating as set forth in claim 1 further comprising an infiltration of said overcoating into the open fingers of said matrix equaling up to about 10%, more or less, of the volume of said matrix.

3. The silicon carbide overcoating as set forth in claim 2 further comprising a continuous barrier between said compact and said atmosphere, said barrier being 100% inspectable by non-destructive techniques and wherein any defects in said barrier can be cured by recoating said compact either locally or totally.

4. The silicon carbide overcoating as set forth in claim 3 wherein said fuel particles are themselves individually coated with layers of silicon carbide and pyrocarbon.

5. The silicon carbide overcoating as set forth in claim 4 wherein the thickness of said overcoating varies, as needed, from a minimum of about 50 micrometers to a maximum of about 1 millimeter or more.

6. The silicon carbide overcoating as set forth in claim 5 wherein kernels of said individually coated fuel particles tend to migrate within said matrix while still being protected by said overcoating.

7. The silicon carbide overcoating as set forth in claim 6 wherein said overcoating is inspected for integrity, thickness surface appearance, and impurity content after compact manufacture but prior to insertion within a graphite fuel element block.

8. The silicon carbide overcoating as set forth in claim 7 wherein said infiltration of said overcoating into said matrix effectively seals off a multitude of channels within said matrix that would otherwise be vents for the escape of fission product gases.

9. The silicon carbide overcoating as set forth in claim 8 wherein said overcoating further prevents trace moisture, oil, or air from entering and thereby contaminating or damaging said compact.

10. The silicon carbide overcoating as set forth in claim 9 wherein the content of the coatings of said individually coated fuel particles within said matrix varies.

11. The silicon carbide overcoating as set forth in claim 10 wherein said overcoating further protects against the small number of said fuel particles whose coatings become damaged during compact manufacture and lading.

12. The silicon carbide overcoating as set forth in claim 11 wherein said overcoating si applied to said compact by chemical or physical vapor depositions or by reaction with liquid silicon or other forms of silicon.

13. The silicon carbide overcoating as set forth in claim 12 further comprising an outer coating around said overcoating to protect said overcoating from abrasion and to improve integrity under thermal cycling.

* * * * *